(12) United States Patent
Qiu et al.

(10) Patent No.: US 8,133,332 B2
(45) Date of Patent: Mar. 13, 2012

(54) METHOD FOR PREPARING FEPT MEDIA AT LOW ORDERING TEMPERATURE AND FABRICATION OF EXCHANGE COUPLED COMPOSITE MEDIA AND GRADIENT ANISOTROPY MEDIA FOR MAGNETIC RECORDING

(75) Inventors: Jiaoming Qiu, Saint Paul, MN (US); Yonghua Chen, Edina, MN (US); Ganping Ju, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 429 days.

(21) Appl. No.: 12/369,844

(22) Filed: Feb. 12, 2009

(65) Prior Publication Data
US 2010/0200124 A1    Aug. 12, 2010

(51) Int. Cl.
*C21D 1/26* (2006.01)

(52) U.S. Cl. ........ 148/527; 148/529; 148/530; 427/130; 427/132

(58) Field of Classification Search .................. 148/527, 148/529, 530; 427/127–132
See application file for complete search history.

(56) References Cited

U.S. PATENT DOCUMENTS

| | | | |
|---|---|---|---|
| 6,605,321 B1 * | 8/2003 | Ravelosona-Ramasitera et al. | 427/528 |
| 2003/0113582 A1 | 6/2003 | Litvinov et al. | |
| 2004/0191578 A1 | 9/2004 | Chen et al. | |
| 2008/0075931 A1 | 3/2008 | Matsui | |
| 2008/0088980 A1 * | 4/2008 | Kitagawa et al. | 360/313 |
| 2008/0254322 A1 | 10/2008 | Klemmer et al. | |

FOREIGN PATENT DOCUMENTS
WO    WO9412681    6/1994

OTHER PUBLICATIONS

U.S. Appl. No. 10/606,546, filed Jun. 26, 2003, Bin Lu et al.
U.S. Appl. No. 11/138,622, filed May 26, 2005, Bin Lu et al.
U.S. Appl. No. 11/336,799, filed Jan. 20, 2006, Dieter K. Weller et al.
U.S. Appl. No. 11/835,476, filed Aug. 8, 2007, Bin Lu et al.
M. H. Hong et al., "Microstructure of FePt/Pt magnetic thin films with high perpendicular coercivity", Journal of Applied Physics, vol. 84, No. 8, Oct. 15, 1998, pp. 4403-4409.
D. J. Sellmyer et al., "High-Anisotropy Nanocomposite Films for Magnetic Recording", IEEE Transactions on Magnetics, vol. 37, No. 4, Jul. 2001, pp. 1286-1291.

\* cited by examiner

*Primary Examiner* — Stanley Silverman
*Assistant Examiner* — Brian Walck
(74) *Attorney, Agent, or Firm* — Robert P. Lenart, Esq.; Pietragallo Gordon Alfano Bosick & Raspanti, LLP

(57) ABSTRACT

A method includes: constructing a multilayer structure including a first layer of Pt, a first layer of A1 phase FePt on the first layer of Pt, and a second layer of Pt on the layer of FePt, and annealing the multilayer structure to convert the A1 phase FePt to $L1_o$ phase FePt.

19 Claims, 3 Drawing Sheets

METHOD FOR PREPARING FEPT MEDIA AT LOW ORDERING TEMPERATURE AND FABRICATION OF EXCHANGE COUPLED COMPOSITE MEDIA AND GRADIENT ANISOTROPY MEDIA FOR MAGNETIC RECORDING

BACKGROUND

Materials with increased magnetic anisotropies are desirable for various applications such as, for example, applications in the data storage industry where there is a continuous need to increase storage densities. Data storage media that can hold densities approaching 1 Tbit/in$^2$ will require materials with magnetic anisotropies greater than conventional media materials. There are known bulk permanent magnetic materials having crystalline phases with magnetocrystalline anisotropy that theoretically can hold densities greater than 1 Tbit/in$^2$. For bulk permanent magnetic materials, special heat treatments are typically used to control the phase formation and microstructure to optimize the material properties. In order to incorporate these materials into a data storage media, the correct crystalline phase must be obtained within a microstructure of fine, nanocrystalline, exchange decoupled or partially exchange decoupled grains while maintaining thermal stability.

$L1_0$ phase FePt binary alloys have magnetocrystalline anisotropy as high as 7×10$^7$ erg/cc, which is well suitable for future magnetic recording media to achieve density over 1 Tb/in$^2$. However, FePt is typically deposited as the face centered cubic (fcc) phase (i.e., the A1 phase) and subsequent annealing is needed to transform (i.e., chemically order) the material into the high anisotropy $L1_0$ phase.

This high temperature processing is likely to enhance grain growth, which is opposite to the small grain size requirement for high density recording. On the other hand, fully ordered FePt media generally have a coercivity over 4 Tesla, which is beyond current writer technology capabilities. It would be desirable to produce FePt media with a small grain size and with magnetic characteristics that are compatible with current writer technology.

SUMMARY

In a first aspect, the invention provides a method including: constructing a multilayer structure including a first layer of Pt, a first layer of A1 phase FePt on the first layer of Pt, and a second layer of Pt on the layer of FePt, and annealing the multilayer structure to convert the A1 phase FePt to $L1_o$ phase FePt.

In another aspect, the invention provides a method including: constructing a multilayer structure including a first layer of Fe, a first layer of A1 phase FePt on the first layer of Fe, and a second layer of Fe on the layer of FePt, and annealing the multilayer structure to convert the A1 phase FePt to $L1_o$ phase FePt.

In another aspect, the invention provides a method including: constructing a multilayer structure including a first layer of Pt, a first layer of A1 phase FePt on the first layer of Pt, and a first layer of Fe on the layer of FePt, and annealing the multilayer structure to produce a graded FePt composite structure with an anisotropy that decreases in a direction from a bottom of the multilayer structure to a top of the multilayer structure.

In another aspect, the invention provides a method including: constructing a multilayer structure including a first layer of Fe, a first layer of A1 phase FePt on the first layer of Fe, and a first layer of Pt on the layer of FePt, and annealing the multilayer structure to produce a graded FePt composite structure with an anisotropy that increases in a direction from a bottom of the multilayer structure to a top of the multilayer structure.

DETAILED DESCRIPTION OF THE INVENTION

In a first aspect, the invention provides a method of fabricating a data storage media that uses a multilayer structure including seed and cap layers of either Fe or Pt on opposite sides of an A1 phase FePt layer, and anneals the multilayer structure to convert the A1 phase FePt to $L1_o$ phase FePt at a relatively low anneal temperature.

Figure 1:
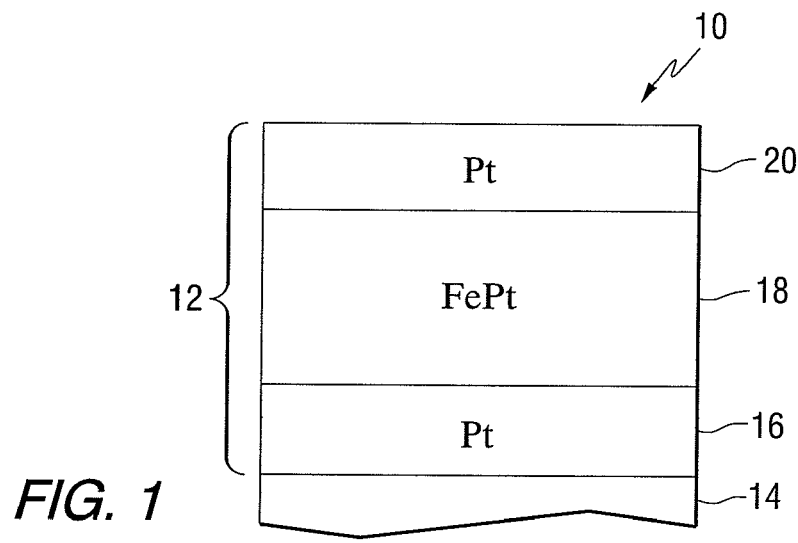
FIG. 1 is a side elevation view of a material stack used in a first aspect of the invention.

FIG. 1 is a side elevation view of a material stack 10 used in a first aspect of the invention. A multilayer structure 12 is formed on a substrate 14. The multilayer structure includes a first layer 16 (e.g., a seed layer) of Pt, a first layer 18 of A1 phase FePt on the first layer of Pt, and a second layer 20 (e.g., a cap layer) of Pt on the layer of FePt. The substrate can be, for example, glass, aluminum or its alloys, etc.

The layers can be formed by physical vapor deposition methods, such as magnetron sputtering, pulsed laser deposition, or ion beam deposition.

In one example, layer 16 can have a thickness ranging from about 0.5 nm to about 2 nm. Layer 18 can have a thickness ranging from about 2 nm to about 10 nm. Layer 20 can have a thickness ranging from about 0 nm to about 5 nM.

The multilayer structure is annealed to convert the A1 phase FePt to $L1_o$ phase FePt. In one example, the annealing step can be performed at about 300° C. for 4 hours. In other examples, the minimum annealing temperature can be in a range from about 200° C. to about 500° C. The annealing temperature needed to convert the A1 phase FePt to $L1_o$ phase FePt will depend on the layer thicknesses.

Figure 2:
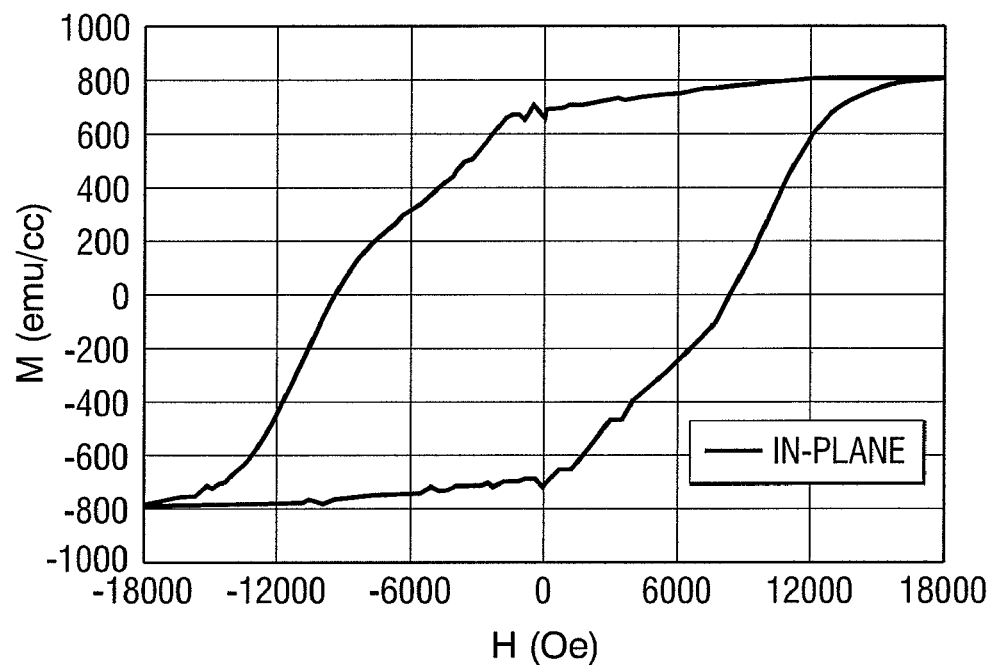
FIG. 2 is a graph of a typical hysteresis loop for materials that can be used in the material stack of FIG. 1.

FIG. 2 is a graph of magnetization versus applied magnetic field (i.e., a hysteresis loop) for a multilayer structure as shown in FIG. 1 in which the FePt layer comprises $Fe_{62}Pt_{38}$. During annealing, there will be some diffusion between the layers, which will depend on annealing temperature used.

FIG. 2 shows a coercivity of about 9130 Oe for the multilayer structure. The hysteresis loop was measured by monitoring the magnetic moment change while the applied field is sweeping from −18000 Oe to +18000 Oe and then swept backwards using a vibrating sample magnetometer (VSM) at room temperature. The magnetic field was applied with its direction parallel to the film plane, which is called an in-plane measurement, and the coercivity is then called the in-plane coercivity.

Figure 3:
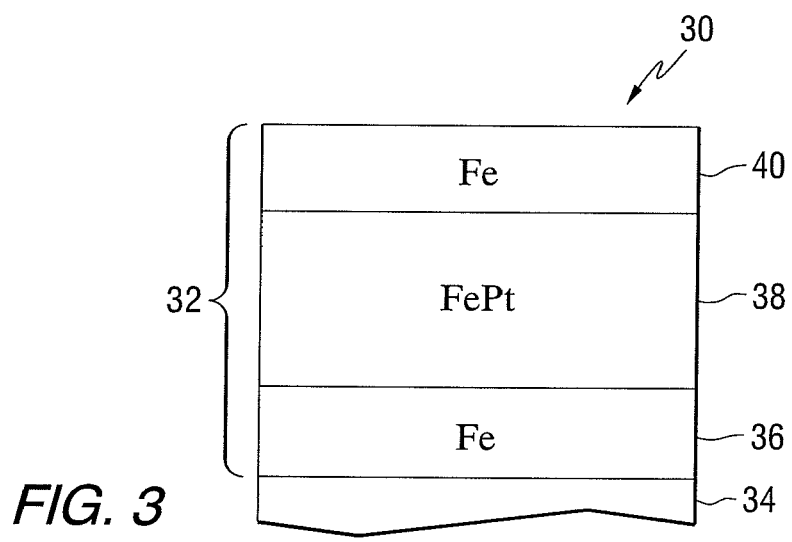
FIG. 3 is a side elevation view of another material stack used in another aspect of the invention.

FIG. 3 is a side elevation view of a material stack 30 used in another aspect of the invention. A multilayer structure 32 is formed on a substrate 34. The multilayer structure includes a first layer 36 (e.g., a seed layer) of Fe, a first layer 38 of A1 phase FePt on the first layer of Fe, and a second layer 40 (e.g., a cap layer) of Fe on the layer of FePt. The multilayer structure is annealed to convert the A1 phase FePt to $L1_o$ phase FePt. The substrate can be, for example, glass, aluminum or its alloys, etc.

In one example, layer 36 can have a thickness ranging from about 0.5 nm to about 2 nm. Layer 38 can have a thickness ranging from about 2 nm to about 10 nm. Layer 40 can have a thickness ranging from about 0 nm to about 5 nm.

The multilayer structure is annealed to convert the A1 phase FePt to $L1_o$ phase FePt. In one example, the annealing step can be performed at about 300° C. for 4 hours. In other examples, the minimum annealing temperature can be in a range from about 200° C. to about 500° C. The annealing temperature needed to convert the A1 phase FePt to $L1_o$ phase FePt will depend on the layer thicknesses.

Figure 4:
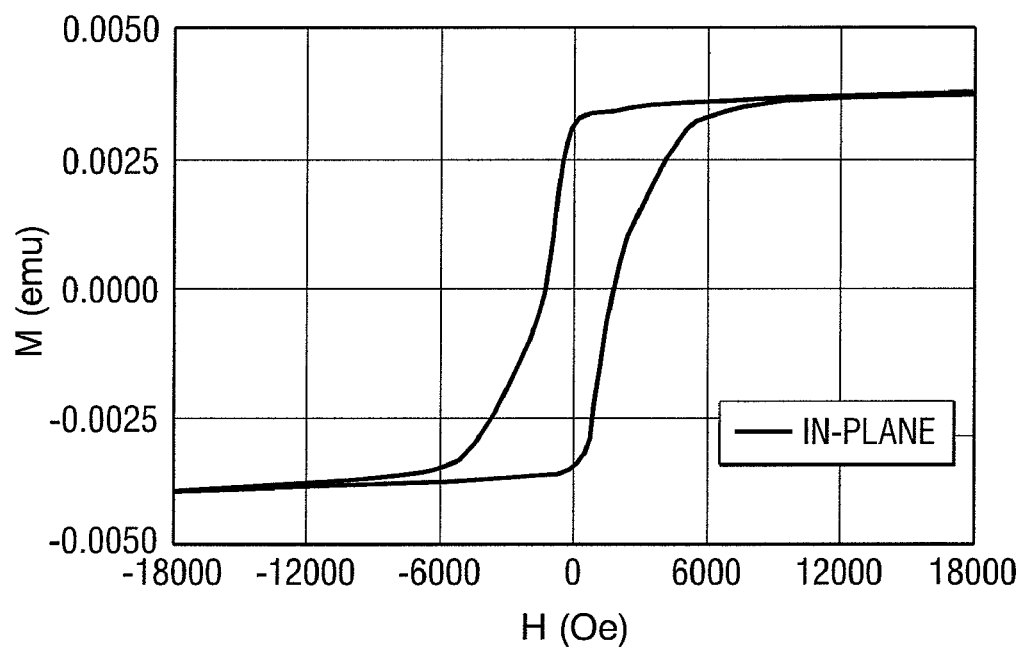
FIG. 4 is a graph of a typical hysteresis loop for materials that can be used in the material stack of FIG. 3.

FIG. 4 is a graph of magnetization versus applied magnetic field for a multilayer structure of FIG. 3 in which the FePt layer comprises $Fe_{36}Pt_{64}$. FIG. 4 shows a coercivity of about 1800 Oe for the multilayer structure.

In the examples of FIGS. 1 and 3, atom diffusion at the two interfaces, between the seed layer and the FePt layer, and between the cap layer and FePt layer, facilitates the chemical ordering process for the whole stack.

The platinum seed and cap combination of FIG. 1 is suitable for an iron rich FePt alloy middle layer, as diffusion will drive the whole film towards the stoichiometric composition of 50 to 50. In one example using platinum as the seed and cap layer, an in-plane coercivity value of 9130 Oe has been achieved after annealing at a temperature as low as 300° C. Similarly, the iron seed and cap combination of FIG. 3 is effective for ordering a platinum rich FePt alloy middle layer.

Media grain size is reduced as the annealing temperature decreases. Thus the use of a low annealing temperature would limit the media grain size. A successful low temperature phase transformation method ensures small grain size for high recording areal density.

Since the inter-diffusion occurs in a direction perpendicular to the plane of the films, grain isolation materials such as $SiO_2$, carbon, boron, or other oxide or nitride material can be applied to keep the FePt grain size within several nm. These grain isolation materials can be applied either by embedding them into the target material, or through co-sputtering from a separate target in the same chamber.

Figure 5:
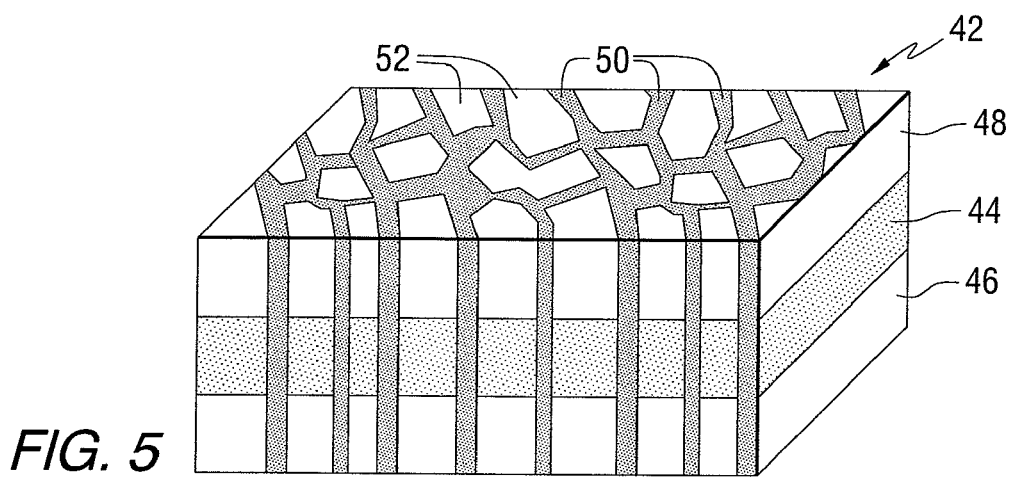
FIG. 5 is a schematic representation of a granular media.

FIG. 5 is a schematic drawing of a media 42 having an FePt layer 44 between Pt seed and cap layers 46, 48. Grain isolation material 50 is shown to be positioned between grains 52 in the stack.

In another aspect, the invention provides data storage media with enhanced writability. One way to enhance writability is to form so-called Exchange-Coupled Composite (ECC) media. ECC media include one magnetically hard phase (in this case low temperature ordered $L1_0$ FePt) and one magnetically soft phase, which can be disordered FePt or other high magnetization materials such as FeNi, FeCo, etc. As used in this description, a magnetically hard material is a material that typically has a coercive force higher than 2000 Oe, and a magnetically soft material is a material that typically has a coercive force lower than 2000 Oe.

To make ECC media, $L1_0$ FePt is prepared at low temperature to keep the grain size small, as described above. Then the top Pt (or Fe) cap layer is removed and the soft phase material is deposited on the $L1_0$ FePt. An optional thin exchange coupling control layer of another material can be deposited before the soft phase material such that the exchange coupling control layer is positioned between the hard and soft layers to tune the interlayer exchange coupling strength. The exchange coupling control layer can be, for example, Pt, PtSi, Pd, or PdSi.

Figure 6:
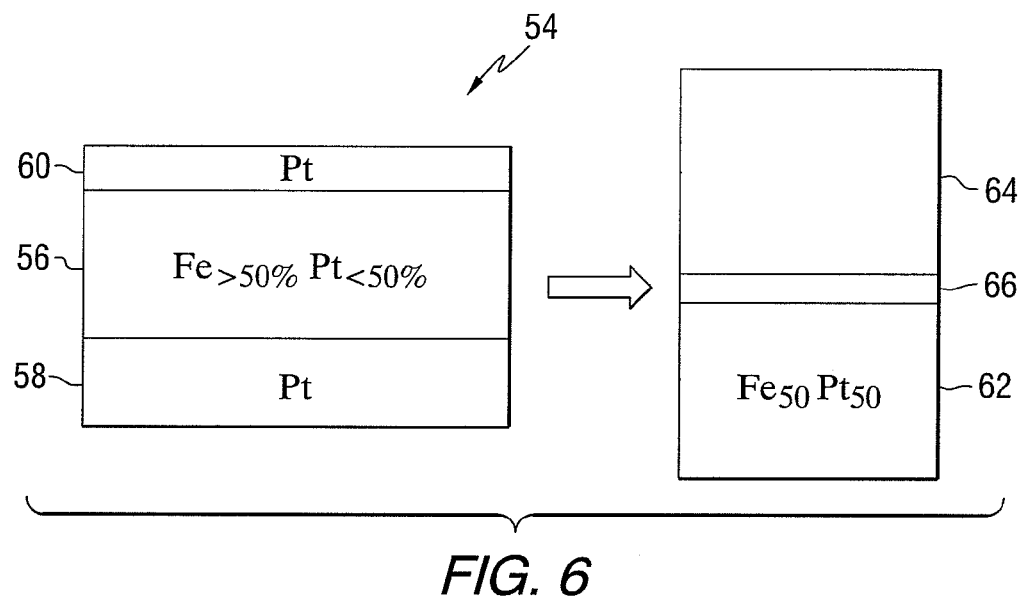
FIG. 6 is a schematic representation of a process for producing exchange coupled composite media.

FIG. 6 is a schematic representation of a process for producing exchange coupled composite media. The process starts with a material stack 54 including a FePt layer 56 sandwiched in between two Pt layers 58, 60, which is annealed to convert the FePt to the $L1_0$ phase in later 62. Next, the cap layer is removed, for example, by plasma etching (e.g., sputtering) or ion beam milling (e.g., ion bombardment). Then a magnetically softer layer 64 is deposited onto the ordered FePt hard layer. Optionally, a thin layer 66 of Pt, Pd, or some non-magnetic material such as silicon containing material, can be deposited on the ordered FePt hard layer prior to the deposition of the magnetically softer layer to control the exchange coupling between the soft or hard layer. The bottom Pt partially diffuses into FePt, any leftover of Pt would be minimal so it should not affect media property.

FIG. 6 shows the use of an iron rich middle layer that is converted to a stoichiometric composition of 50 to 50. Such conversion can be implemented by annealing or by elevated temperature deposition, wherein the media stack is deposited at temperatures higher than room temperature.

In another aspect, the invention provides graded anisotropy (GA) media, which has been proposed theoretically to address the writability issue. Inter-diffusion of iron and platinum atoms is used to produce a composition gradient as well as a chemical ordering gradient, which in turn provides an anisotropy gradient.

Figure 7:
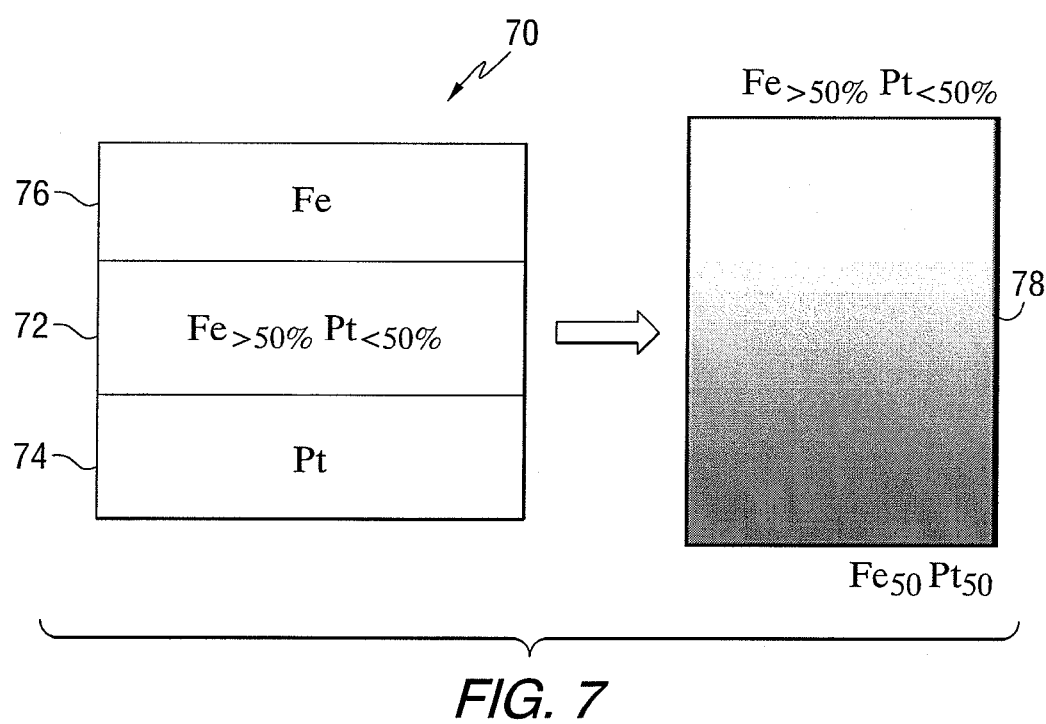
FIG. 7 is a schematic representation of a process for producing graded anisotropy media.

FIG. 7 is a schematic representation of a process for producing graded anisotropy media. The process starts with a material stack 70 including an iron rich FePt layer 72 sandwiched in between a Pt seed layer 74 and a Fe cap layer 76. The stack is annealed to produce a graded layer 78 having a substantially stoichiometric composition of 50 to 50 near the bottom and an iron rich composition near the top. Such conversion can also be implemented by elevated temperature deposition, wherein the media stack is deposited at temperatures higher than room temperature.

It is well known that a concentration gradient can help the diffusion of atoms. In the annealing process, thermal energy helps to create vacancies and enhance the mobility of atoms to allow for atomic reorganization. The gradient can be tuned by adjusting seed and cap thickness, as well as by adjusting the annealing temperature or time.

FePt media anisotropy strongly depends on the composition, and maximizes around $Fe_{50-55}Pt_{50-45}$. The anisotropy decreases when the material composition is off stoichiometry. For the purposes of this description, perfect $L1_0$ FePt stoichiometry refers to $Fe_{50-55}Pt_{50-45}$.

With the process of FIG. 7, it is possible to establish gradient anisotropy media with a composition gradient. This can be, for example, achieved by using Pt diffusion from the bottom and Fe diffusion from the top layer, and results in close to equal stoichiometry at the bottom (high anisotropy K) and an Fe rich composition on the top (low anisotropy K). A similar approach can be implemented by sandwiching iron deficient FePt film between a Fe seed layer and a Pt cap layer, with Fe diffusion from the bottom and Pt diffusion from the top.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:

1. A method comprising:
constructing a multilayer structure including a first layer of Pt, a first layer of A1 phase FePt on the first layer of Pt, and a second layer of Pt on the layer of FePt; annealing the multilayer structure to convert the A1 phase FePt to $L1_o$ phase FePt;
removing the second layer of Pt; and
depositing a layer of magnetically soft material on the $L1_o$ phase FePt.

2. The method of claim 1, wherein the annealing step is performed at about 300° C.

3. The method of claim 1, wherein the A1 phase FePt is Fe rich and comprises:
$Fe_{50+x}Pt_{50-x}$, where x is larger than 5 but less than 30.

4. The method of claim 1, wherein the multilayer structure further comprises:
grain isolation material.

5. The method of claim 1, wherein:
the first layer of Pt has a thickness in the range of from about 0.5 nm to about 2 nm;
the first layer of A1 phase FePt on the first layer of Pt has a thickness in the range of from about 2 nm to about 10 nm; and
the second layer of Pt on the layer of FePt has a thickness in the range of from about 0 nm to about 5 nm.

6. The method of claim 1, wherein the multilayer structure is on a substrate comprising one of:
glass, aluminum, or an aluminum alloy.

7. The method of claim 1, wherein the multilayer structure is formed by physical vapor deposition.

8. The method of claim 1, wherein the physical vapor deposition comprises one of:
magnetron sputtering, pulsed laser deposition, or ion beam deposition.

9. The method of claim 1, wherein the annealing step is performed at a minimum annealing temperature in a range from about 200° C. to about 500° C.

10. A method comprising:
constructing a multilayer structure including a first layer of Pt, a first layer of A1 phase FePt on the first layer of Pt, and a second layer of Pt on the layer of FePt;
annealing the multilayer structure to convert the A1 phase FePt to $L1_o$ phase FePt;
removing the second layer of Pt;
depositing an exchange control layer on the $L1_o$ phase FePt; and
depositing a layer of magnetically soft material on the exchange control layer.

11. The method of claim 10, wherein the exchange control layer comprises at least one of:
Pt, Pd, or a non-magnetic material.

12. The method of claim 10, wherein the multilayer structure further comprises:
grain isolation material.

13. The method of claim 10, wherein the annealing step is performed at about 300° C.

14. The method of claim 10, wherein the A1 phase FePt is Fe rich and comprises:
$Fe_{50+x}Pt_{50-x}$, where x is larger than 5 but less than 30.

15. The method of claim 10, wherein:
the first layer of Pt has a thickness in the range of from about 0.5 nm to about 2 nm;
the first layer of A1 phase FePt on the first layer of Pt has a thickness in the range of from about 2 nm to about 10 nm; and
the second layer of Pt on the layer of FePt has a thickness in the range of from about 0 nm to about 5 nm.

16. The method of claim 10, wherein the multilayer structure is on a substrate comprising one of:
glass, aluminum, or an aluminum alloy.

17. The method of claim 10, wherein the multilayer structure is formed by physical vapor deposition.

18. The method of claim 10, wherein the physical vapor deposition comprises one of:
magnetron sputtering, pulsed laser deposition, or ion beam deposition.

19. The method of claim 10, wherein the annealing step is performed at a minimum annealing temperature in a range from about 200° C. to about 500° C.

* * * * *